United States Patent Office 3,096,315
Patented July 2, 1963

---

3,096,315
1-(1,2-EPOXYETHYL)-2-VINYLCYCLOBUTANE AND POLYMERS THEREOF
Samuel W. Tinsley and Donald L. MacPeek, South Charleston, W. Va., assignors to Union Carbide Corporation, a corporation of New York
No Drawing. Filed Apr. 27, 1961, Ser. No. 105,879
16 Claims. (Cl. 260—88.3)

This invention relates to the preparation of 1-(1,2-epoxyethyl)-2-vinylcyclobutane. In one aspect, the invention relates to polymeric products of 1-(1,2-epoxyethyl)-2-vinylcyclobutane. In other aspects, the invention relates to curable, polymerizable compositions comprising the aforementioned polymeric products, and to the cured resins resulting therefrom.

The novel ethylenically unsaturated epoxide monomer, i.e., 1-(1,2-epoxyethyl)-2-vinylcyclobutane, of the invention has the following formula:

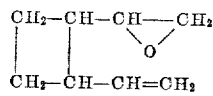

This novel monomer can be prepared by the reaction of the corresponding, non-epoxidized diolefinic precursor, i.e., 1,2-divinylcyclobutane, with an organic peracid. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally-liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of the peracid is preferred. The epoxidation reaction can be conducted at a temperature in the range of from about 0° C., and lower, to about 100° C., and higher, and preferably from about 20° to about 80° C. Substantial conversion of diolefinic precursor to 1-(1,2-epoxyethyl)-2-vinylcyclobutane is favored or accomplished by employing at least one mol of said precursor per mol of peracid, e.g., from about 1.0 to about 10, and higher, mols of precursor per mol of peracid. However, a slight molar excess of peracid to precursor can be used, but with the attendant disadvantage of correspondingly diminished yields of 1-(1,2-epoxyethyl)-2-vinylcyclotbutane. In general, the epoxidation reaction is conducted for a period of time which is sufficient to essentially consume the quantity of peracid employed. Periodic analysis of samples of the reaction mixture to determine the quantity of peracid consumed during the epoxidation reaction can be readily performed by the operator by well-known techniques. At the termination of the epoxidation reaction, the unreacted diolefinic precursor, acid by-product, inert vehicle, if employed, and the like, can be recovered from the reaction product mixture, for example, by distillation under reduced pressure. Further well-known procedures such as fractional distillation, and the like, can be used to separate the 1-(1,2-epoxyethyl)-2-vinylcyclobutane from any epoxide by-product.

The diolefinic precursor, 1,2-divinylcyclobutane, can be prepared by the non-catalyzed, thermal dimerization of 1,3-butadiene. This reaction is conducted in the liquid phase, under superatmospheric pressure, and at moderately elevated temperatures, e.g., about 100° C. to about 180° C. At the termination of the reaction, 1,2-divinylcyclobutane can be recovered from the reaction product mixture by conventional techniques such as by fractional distillation.

The novel monomer of the invention is characterized by the presence of one vicinal epoxy group,

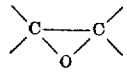

and one ethylenic group,

in the molecule. The presence of these two functional groups in the molecule makes them highly useful in a wide variety of chemical reactions whereby novel, useful products are obtained. For example, the novel monomer can be homopolymerized through the ethylenic group, or the novel monomer can be copolymerized with other ethylenically unsaturated organic compound(s) (described hereinafter and termed "vinyl monomer," for brevity) through their ethylenic groups, preferably in the presence of a peroxide catalyst (described hereinafter), to give soluble, fusible, essentially linear polymeric products which contain a plurality of free or pendant vicinal epoxy groups. These polymeric products which contain a plurality of free vicinal epoxy groups then can be admixed with an active organic hardener (described hereinafter) and/or an acidic or basic catalyst (described hereinafter) to give curable, polymerizable compositions which can be partially cured or fully cured to infusible, thermoset, cross-linked resinous products. By way of a second illustration, the novel monomer can be homopolymerized through the vicinal epoxy group, or the novel monomer can be copolymerized with other polyepoxides (described hereinafter) through the vicinal epoxy groups, preferably in the presence of an acidic or basic catalyst, to give polymeric products which contain a plurality of free or pendant ethylenic groups. These polymeric products which contain a plurality of free ethylenic groups then can be admixed with a vinyl monomer and/or peroxide catalyst and polymerized through the ethylenic groups to give infusible, cross-linked resinous products.

Accordingly, one embodiment of the invention is directed to the homopolymerization of 1-(1,2-epoxyethyl)-2-vinylcyclobutane in the presence of a peroxide catalyst, said homopolymerization being effected through the ethylenic group of said 1-(1,2-epoxyethyl)-2-vinylcyclobutane, whereby novel homopolymeric products which contain a plurality of free vicinal epoxy groups are obtained. The homopolymerization reaction can be conducted at a temperature in the range of from about 0° C., and lower, to about 150° C., and higher, and for a period of time sufficient to yield novel soluble, fusible, essentially linear homopolymeric products (containing free vicinal epoxy groups).

A second embodiment of the invention is directed to the polymerization of the novel homopolymeric products (of the first embodiment) in the presence of an acidic or basic catalyst, said polymerization being effected through the vicinal epoxy groups, to give novel insoluble, infusible, cross-linked resinous products. The polymerization reaction can be conducted at a temperature range of from about 10° C. to about 250° C., and higher, and for a period of time ranging from several minutes to several hours.

A third embodiment of the invention is directed to the copolymerization of the novel homopolymeric products (of the first embodiment) with polyepoxides, preferably in the presence of an acidic or basic catalyst, said copolymerization being effected through the vicinal epoxy groups, to give novel insoluble, infusible, cross-linked resinous products. The polymerization reaction can be conducted at a temperature range of from about 10° C. to about 250° C., and higher, and for a period of time ranging from several minutes to several hours.

A fourth embodiment of the invention is directed to the polymerization of the novel homopolymeric products (of the first embodiment) with an active organic hardener, with or without an acidic or basic catalyst, to give novel partially cured, fusible, thermosetting, intermediate reaction products, or novel fully cured, insoluble, infusible, thermoset, cross-linked resinous products. This reaction can be conducted at a temperature in the range of from about 10° C. to about 250° C. The reaction time will depend, of course, on the degree of cure desired and other considerations well-known to the epoxy artisan.

A fifth embodiment of the invention is directed to the homopolymerization of 1-(1,2-epoxyethyl)-2-vinylcyclobutane in the presence of an acidic or basic catalyst, said homopolymerization being effected through the vicinal epoxy group of said 1-(1,2-epoxyethyl)-2-vinylcyclobutane, whereby novel homopolymeric products which contain a plurality of free ethylenic groups are obtained. This homopolymerization reaction can be conducted at a temperature in the range of from about 10° C. to about 250° C., and higher, and for a period of time sufficient to yield novel soluble, fusible, essentially linear homopolymeric products (containing free ethylenic groups).

A sixth embodiment of the invention is directed to the polymerization of the novel homopolymeric products (of the fifth embodiment) in the presence of a peroxide catalyst, said homopolymerization being effected through the ethylenic groups, to give novel insoluble, cross-linked resinous products. A reaction temperature in the range of from about 0° C., and lower to about 150° C., and higher, is suitable. The reaction time can be varied from several minutes to several hours.

A seventh embodiment of the invention is directed to the copolymerization of the novel homopolymeric products (of the fifth embodiment) with a vinyl monomer, in the presence of a peroxide catalyst, said copolymerization being effected through the ethylenic groups, to give novel insoluble, cross-linked resinous products. A reaction temperature in the range of from about 0° C., and lower, to about 150° C., and higher, is suitable. The reaction time can be varied from several minutes to several hours.

The invention also contemplates other embodiments such as the copolymerization of 1-(1,2-epoxyethyl)-2-vinylcyclobutane with a vinyl monomer, preferably in the presence of a peroxide catalyst, to give copolymeric products which contain a plurality of free vicinal epoxy groups. The copolymeric products then can be reacted with an acidic or basic catalyst, or a polyepoxide, or an active organic hardener, whereby useful insoluble, infusible, cross-linked resinous products are obtained. The operative conditions of these reactions are similar to those discussed in the seven embodiments supra.

The novel homopolymers of 1-(1,2-epoxyethyl)-2-vinylcyclobutane, and the novel copolymers of 1-(1,2-epoxyethyl)-2-vinylcyclobutane and an ethylenically unsatuated organic compound (the homopolymerization and copolymerization having been effected through the ethylenic groups), contain the following recurring structural unit:

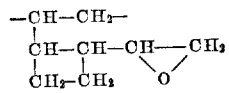

The novel homopolymers of 1-(1,2-epoxyethyl)-2-vinylcyclobutane which have been homopolymerized through the vicinal epoxy group contain the following recurring structural unit:

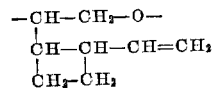

Moreover, the novel copolymers of 1-(1,2-epoxyethyl)-2-vinylcyclobutane with conventional saturated monoepoxides or polyepoxides (providing that the copolymerization is not allowed to proceed beyond the stage where fusible intermediate reaction products result) which have been copolymerized through the vicinal epoxy groups, also, contain the recurring structural unit depicted immediately above. It is to be understood that by the term "copolymer," as used herein including the appended claims, is meant a product which results from the copolymerization reaction of two or more copolymerizable monomers, said monomers entering into the copolymerization reaction in significant quantities. As such, the resulting copolymeric products are chemically distinguishable from the homopolymeric products which would result from the homopolymerization of the monomers separately. It is preferred, however, that the novel copolymeric products of the invention contain from about 5 to about 95 weight percent of 1-(1,2-epoxyethyl)-2-vinylcyclobutane. Moreover, the novel homopolymers and novel copolymers discussed in this paragraph are essentially linear, fusible, addition products which range from viscous liquids to solid products.

The acidic and basic catalysts which can be employed in the appropriate embodiments discussed supra include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoridedipropyl ether complex, and the like; the strong mineral acids, e.g., phosphoric acid, polyphosphoric acid, and the like; the saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted-benzenesulfonic acid, and the like; the stannous acylates, e.g., stannous acetate, stannous butyrate, stannous hexanoate, stannous octanoate, stannous benzoate, and the like; the stannic alkoxides, e.g., stannic butoxide, stannic 2-ethylhexoxide, and the like; the alkali metal hydroxides, e.g., sodium hydroxide, potassium hydroxide, and the like, the tertiary amines, e.g., trimethylamine, triethylamine, and the like. The boron trifluoride-amine complexes are highly preferred. The acidic or basic catalysts can be employed in amounts ranging from about 0.001 to about 10, and higher, weight percent, based on the total weight of epoxide component(s). It is pointed out that by the term "vicinal epoxy polymerization catalyst," as used herein including the appended claims, is meant those catalysts, such as illustrated above, which effect the homopolymerization of copolymerization of the epoxide component(s) through the vicinal epoxy groups.

The peroxide catalysts which can be employed in the apropos embodiments discussed supra include, for instance, benzoyl peroxide, methyl ethyl ketone peroxide, methyl isobutyl ketone peroxide, p-menthane hydroperoxide, t-butyl hydroperoxide, cumene hydroperoxide, acetyl peroxide, cyclohexanone peroxide, lauroyl peroxide, di-t-butyl peroxide, t-butyl perbenzoate, and the like. The concentration of the peroxide catalyst can range from about 0.01, and lower, to about 5.0, and higher, weight percent, based on the total weight of ethylenic component(s).

Representative polyepoxides which can be employed (in the third embodiment supra) include, among others, 4-vinylcyclohexene dioxide, dicyclopentadiene dioxide, divinylbenzene dioxide, 3,4-epoxy-6-methylcyclohexylmethyl 3,4-epoxy-6-methylcyclohexanecarboxylate, diethylene glycol bis(3,4-epoxycyclohexanecarboxylate), bis(2,3-epoxycyclopentyl) ether, bis(3,4-epoxycyclohexylmethyl) pimelate, 1,1,1-trimethylolpropane tris(3,4- epoxycyclohexanecarboxylate), the polyglycidyl polyethers of polyhydric phenols, and the like.

Among the ethylenically unsaturated compounds which are contemplated are those which contain a polymerizable ethylenic bond. Illustrative ethylenically unsaturated compounds include, for example, styrene, alkylstyrene, chlorostyrene, ethylstyrene, dimethylstyrene, isopropylstyrene, divinylbenzene, alkyl acrylate, alkyl methacrylate, alkyl crotonate, methyl acrylate, ethyl acrylate, n-propyl acrylate, n-butyl acrylate, methyl methacrylate, ethyl methacrylate, isopropyl methacrylate, n-amyl methacrylate, methyl crotonate, ethyl crotonate, n-propyl crotonate, t-butyl crotonate, 2-ethylhexyl crotonate, vinyl acetate, vinyl propionate, vinyl butyrate, vinyl valerate, and the like. Additional desirable monomeric ethylenically unsaturated compounds include, for instance, triallyl cyanurate, diallyl phthalate, triallylamine, acrylonitrile, allyl acrylate, allyl methacrylate, allyl crotonate, allyl butyrate, allyl 2-ethylhexanoate, allyl benzoate, and the like.

The active organic hardeners which can be employed in the fourth embodiment supra include polycarboxylic acids, polycarboxylic acid anhydrides, polyfunctional amines, polyols, polythiols, polyisocyanates, polyacyl halides, and the like. The active organic hardeners illustrated hereinafter can be employed in a curing amount, that is, an amount which is sufficient to cause the curable system comprising the novel epoxide component(s) to become a thermosetting or thermoset copolymeric resin in accordance with the teachings of the instant specification.

Representative polycarboxylic acids which are contemplated include, for instance, oxalic acid, succinic acid, glutaric acid, adipic acid, suberic acid, alkylsuccinic acids, alkenylsuccinic acids, maleic acid, itaconic acid, allylmalonic acid, 3-hexynedioic acid, 1,2-cyclohexanedicarboxylic acid, phthalic acid, terephthalic acid, and the like. It is desirable to employ the polycarboxylic acid and epoxide component in such relative amounts so as to provide from about 0.1 to about 2.0 carboxy groups, i.e., —COOH groups, of said acid per epoxy group, i.e.

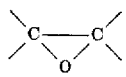

group, of said epoxide component.

Illustrative polycarboxylic acid anhydrides include, for example, phthalic anhydride, tetrahydrophthalic anhydride, maleic anhydride, glutaric anhydride, succinic anhydride, nonenylsuccinic anhydride, 1,8-naphthalic anhydride, lower alkyl substituted-bicyclo[2.2.1]hept-5-ene - 2,3 - dicarboxylic anhydride, methylbicyclo[2.2.1] hept - 2 - ene - 2,3 - dicarboxylic anhydride, and the like. The polycarboxylic acid anhydride and epoxide component are employed in such relative amounts so as to provide from about 0.1 to about 4.0 carboxy groups of said anhydride per epoxy group of said epoxide component. It should be noted that by the expression "carboxy groups of said anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different langauge, by the expression "carboxy groups of said anhydride" is meant the carboxy groups contained in the "hydrated" polycarboxylic acid anhydride.

Representative polyols include, by way of example, ethylene glycol, diethylene glycol, the polyethylene glycols, propylene glycol, the polypropylene glycols, 1,1,1-trimethylolpropane, the polyvinyl alcohols, the cyclopentanediols, the cyclohexanediols, resorcinol, catechol, bis(4-hydroxphenyl - 2,2 - propane, 1,8 - naphthalenediol, and the like. It is pointed out that the term "polyol," as used herein, includes those organic compounds which have at least two hydroxy (—OH) groups and they can be alcoholic hydroxy groups, phenolic hydroxy groups, or both alcoholic and phenolic hydroxy groups. The term "polyol" preferably encompasses the polyhydric alcohols and the polyhydric phenols. In general, the proportions of polyol and epoxide component are such so as to provide from about 0.1 to about 2.0 hydroxy groups of said polyol per epoxy group of said epoxide component.

Among the polyfunctional amines contemplated include the aliphatic amines, the aromatic amines, the aralkyl amines, the cycloaliphatic amines, the alkaryl amines, the aliphatic polyamines which include the polyalkylene polyamines, the amino-substituted monohydric and polyhydric aliphatic alcohols and phenols, the addition products of polyamines and low molecular weight epoxides containing oxirane oxygen linked to vicinal carbon atoms, and others. By the term "polyfunctional amine," as used herein, is meant an organic amine having at least two active amino hydrogen atoms which can be on the same nitrogen atom or on different nitrogen atoms. The relative proportions of polyfunctional amine and epoxide component provide from about 0.2 to about 5.0 amino hydrogen atoms of said amine per epoxy group of said epoxide component.

The novel, curable, polymerizable compositions comprising an epoxide component(s) can be readily handled in resin-forming operations such as coating, laminating, bonding, molding, casting, potting, encapsulating, and the like. These polymerizable compositions are capable of accepting solid materials, such as fillers and pigments, for providing various effects in physical properties and coloration. With or without such added solid materials, these polymerizable compositions can be made to fill small intricacies of molds without the necessity of applying high pressures or heating to high temperatures, although such measures can be employed, if desired. These polymerizable compositions can be cured in molds which have intricate surfaces, and the resulting molded resin exhibits exact and fine details of the mold. These polymerizable compositions, also, can be advantageously employed in the potting of fragile articles such as electronic components.

The novel polymerizable compositions comprising an ethylenic component(s) readily yield novel polymeric products (as illustrated previously) which products have utility as hydraulic fluids, lubricating oils, molding compositions, cable insulation, and the like. In addition, these novel polymeric products have a variety of uses in the rubber art as is readily apparent to the artisan skilled in this art.

The following examples are illustrative. Unless otherwise indicated, the examination or description of the products were conducted at room temperature, i.e., about 24° C.

*Example 1*

To a two-liter, four-necked reaction flask equipped with a stirrer, a thermometer, a reflux condenser, and an addition funnel, there were charged 150 grams of trans-1,2-divinylcyclobutane and 150 grams of ethyl acetate. Thereafter, there was added 413 grams of a solution which contained 25.6 weight percent peracetic acid in ethyl acetate over a period of one hour. The temperature range was maintained at about 30° to 35° C. during the peracetic acid addition. After an additional 5.5 hours at 30°–35° C., analysis indicated that 92 percent of the available peracetic acid was consumed. Distillation of the resulting reaction product mixture at reduced pressure (first with ethylbenzene at 40 mm. of Hg to effect removal of low boiling components and acetic acid by-product)

gave 56.5 grams of trans-1-(1,2-epoxyethyl)-2-vinylcyclobutane which had the following properties:

Boiling point _____ 66° C. at 25 mm. of Hg.
$n_D^{30}$ _____ 1.4546.
Purity as epoxide (pyridine hydrochloride/pyridine) __ 99 percent.

| Elemental analysis | Found (percent) | Calculated (percent) |
| --- | --- | --- |
| Carbon | 77.58 | 77.37 |
| Hydrogen | 9.89 | 9.74 |

Infrared absorption _____ Terminal epoxide at 11.48$\mu$ and 12.3$\mu$; terminal vinyl group at 10.05$\mu$, 11.2$\mu$, and 6.1$\mu$; absence of foreign functional group absorptions.

The yield was 33 percent of the theoretical.

Example 2

A Pyrex tube (14 mm. x 12 inches, sealed at one end) was flushed with nitrogen and then charged with 7.0 grams of acrylonitrile, 3.0 grams of trans-1-(1,2-epoxyethyl)-2-vinylcyclobutane, and 0.1 gram of azo-bis(isobutyronitrile). The tube was reflushed with nitrogen, sealed, and placed in a constant temperature bath maintained at 50° C. for a period of 1.75 hours. Thereafter, the tube was opened and the contents were washed with isopropanol, followed by recovering said contents via filtration, and drying same at about 50° C. in a forced air oven. The dried solid copolymeric product weighed 0.9 gram (5.1 percent conversion per hour) and contained 21.72 weight percent nitrogen by analysis. The product possessed a reduced viscosity value of 3.82 as determined at a concentration of 0.2 gram of said product in 100 milliliters of dimethylformamide at 30° C.

Example 3

A Pyrex tube (14 mm. x 12 inches, sealed at one end) was flushed with nitrogen and then charged with 7.0 grams of vinylidene chloride, 3.0 grams of trans-1-(1,2-epoxyethyl)-2-vinylcyclobutane, and 0.1 gram of azo-bis(isobutyronitrile). The tube was reflushed with nitrogen, sealed, and placed in a constant temperature bath maintained at 50° C. for a period of 16 hours. Thereafter, the tube was opened and the contents were washed with isopropanol, followed by recovering said contents via filtration, and drying same at about 50° C. in a forced air oven. The rate of conversion was 0.38 percent per hour. Analysis established that the resulting copolymeric product contained 64.8 percent chlorine (corresponding to 88.4 percent polyvinylidene chloride). This product possessed a reduced viscosity value of 0.008 as determined at a concentration of 0.2 gram of said product in 100 milliliters of cyclohexanone at 30° C.

Example 4

A Pyrex tube (14 mm. x 12 inches, sealed at one end) was flushed with nitrogen and then charged with 9.0 grams of vinyl chloride, 1.0 gram of trans-1-(1,2-epoxyethyl)-2-vinylcyclobutane, and 0.1 gram of azo-bis(isobutyronitrile). The tube was reflushed with nitrogen, sealed, and placed in a constant temperature bath maintained at 50° C. for a period of 7 hours. Thereafter, the tube was opened and the contents were washed with isopropanol, followed by recovering said contents via filtration, and drying same at about 50° C. in a forced air oven. The rate of conversion was 0.43 percent per hour. Analysis established that the resulting copolymeric product contained 52.2 percent chlorine (corresponding to 91.7 percent polyvinyl chloride). This product possessed a reduced viscosity value of 0.29 as determined at a concentration of 0.2 gram of said product in 100 milliliters of cyclohexanone at 30° C.

Example 5

To a reaction vessel, there were charged trans-1-(1,2-epoxyethyl)-2-vinylcyclobutane and 0.7 weight percent dibutylzinc, based on the weight of the epoxide component. The reaction was conducted at 50° C. for a period of 125 hours. The conversion to polymer was 50 percent. This polymer was a white tacky solid which possessed a reduced viscosity value of 1.2 as determined at a concentration of 0.2 gram of said product in 100 milliliters of benzene at 30° C.

Example 6

To a Pyrex tube, there are charged 100 parts by weight of trans - 1 - (1,2 - epoxyethyl) - 2 - vinylcyclobutane and 3 parts by weight of boron trifluoride-monoethylamine complex. The resulting admixture is heated to 100° C. for a period of 8 hours. The resulting product is a fusible, solid homopolymeric product which contains free ethylenic groups. This homopolymeric product then is heated with 1.5 weight percent benzoyl peroxide (which is contained as a 25 weight percent solution in dimethyl phthalate) for a period of 5 hours at 75° C. There is obtained a hard, infusible, solid product.

Example 7

To a Pyrex tube, there are charged 100 parts by weight of trans - 1 - (1,2 - epoxyethyl) - 2 - vinylcyclobutane and 3 parts by weight of boron trifluoride-dimethyl ether complex. The resulting admixture is heated to 160° C. for a period of 4 hours. The resulting product is a fusible, solid homopolymeric product which contains free ethylenic groups. This homopolymeric product then is heated with 1.0 weight percent acetyl peroxide (which is contained as a 25 weight percent solution in dimethyl phthalate) for a period of 4 hours at 70° C. There is obtained a hard, infusible solid product.

Example 8

To a Pyrex tube, there are charged 100 parts by weight of trans - 1 - (1,2 - epoxyethyl) - 2 - vinylcyclobutane and 1.0 part by weight of benzoyl peroxide (which is contained as a 25 weight percent solution in N,N-dimethylformamide). The resulting admixture is heated to 60° C. for a period of 3 hours. There is obtained a fusible, homopolymeric product which contains free vicinal epoxy groups. This homopolymeric product then is heated with 2.0 weight percent boron trifluoride-monoethylamine complex for a period of 6 hours at 160° C. There is obtained a hard, infusible solid product.

Example 9

To a Pyrex tube, there are charged 100 parts by weight of trans - 1 - (1,2 - epoxyethyl) - 2 - vinylcyclobutane, 100 parts by weight of 4-vinylcyclohexene dioxide, and 4 parts by weight of boron trifluoride-monoethylamine complex. The resulting admixture is heated to 160° C. for a period of 8 hours. There is obtained a solid copolymeric product.

Example 10

To a Pyrex tube, there are charged 100 parts by weight of trans - 1 - (1,2 - epoxyethyl) - 2 - vinylcyclobutane and 2 parts by weight of acetyl peroxide (which is contained as a 25 weight percent solution in N,N-dimethylformamide). The resulting admixture is heated to 60° C. for a period of 4 hours. The resulting product is a fusible, solid homopolymeric product which contains free vicinal epoxy groups. This homopolymeric product is admixed with phthalic anhydride in amounts so as to provide 1.0 carboxy group of said phthalic anhydride per epoxy group of said homopolymeric product. The resulting admixture then is heated to about 120° C. for 2 hours plus an additional 4 hours at 160° C. There is obtained a hard, infusible solid product.

Example 11

To a Pyrex tube, there are charged 100 parts by weight of trans - 1 - (1,2 - epoxyethyl ) - 2 - vinylcyclobutane and 3 parts by weight of benzoyl peroxide (which is contained as a 25 weight percent solution in N,N-dimethylformamide). The resulting admixture is heated to 50° C. for a period of 4 hours. The resulting product is a fusible, solid homopolymeric product which contains free vicinal epoxy groups. This homopolymeric product is admixed with adipic acid in amounts so as to provide 1.0 carboxy group of said adipic acid per epoxy group of said homopolymeric product. The resulting admixture then is heated to about 100° C. for 4 hours plus an additional 4 hours at 170° C. There is obtained a hard, infusible solid product.

Example 12

To a Pyrex tube, there are charged 100 parts by weight of trans - 1 - (1,2 - epoxyethyl) - 2 - vinylcyclobutane and 2.0 parts by weight of acetyl peroxide (which is contained as a 25 weight percent solution in N,N-dimethylformamide). The resulting admixture is heated to 50° C. for a period of 2.5 hours. The resulting product is a fusible, solid homopolymeric product which contains free vicinal epoxy groups. This homopolymeric product is admixed with ethylene glycol in amounts so as to provide 1.0 hydroxy group of said ethylene glycol per epoxy group of said homopolymeric product. The resulting admixture then is heated to about 120° C. for 4 hours plus an additional 6 hours at 180° C. There is obtained a hard, solid product.

Example 13

To a Pyrex tube, there are charged 100 parts by weight of trans - 1 - (1,2 - epoxyethyl) - 2 - vinylcyclobutane and 1.5 parts by weight of acetyl peroxide (which is contained as a 25 weight percent solution in N,N-dimethylformamide). The resulting admixture is heated to 60° C. for a period of 3 hours. The resulting product is a fusible homopolymeric product which contains free vicinal epoxy groups. This homopolymeric product is admixed with resorcinol in amounts so as to provide 1.0 hydroxy group of said resorcinol per epoxy group of said homopolymeric product. To the resulting admixture, there is added 0.1 weight percent potassium hydroxide (which is contained as a 17 weight percent solution in ethylene glycol). The admixture then is heated to about 120° C. for 2 hours plus an additional 4 hours at 160° C. There is obtained a hard, infusible solid product.

Example 14

To a Pyrex tube, there are charged 100 parts by weight of trans - 1 - (1,2 - epoxyethyl) - 2 - vinylcyclobutane and 2 parts by weight of acetyl peroxide (which is contained as a 25 weight percent solution in N,N-dimethylformamide). The resulting admixture is heated to 40° C. for a period of 4 hours. The resulting product is a fusible, solid homopolymeric product which contains free vicinal epoxy groups. This homopolymeric product is admixed with diethylenetriamine in amounts so as to provide 1.0 amino hydrogen atoms of said diethylenetriamine per epoxy group of said homopolymeric product. The resulting admixture then is heated to about 120° C. for 2 hours plus an additional 6 hours at 160° C. There is obtained, a hard, infusible solid product.

Reasonable variations and modifications of the invention can be made or carried out in the light of the above disclosure without departing from the spirit and scope thereof.

What is claimed is:

1. 1-(1,2-epoxyethyl)-2-vinylcyclobutane.

2. A fusible polymer of 1-(1,2-epoxyethyl)-2-vinylcyclobutane which ranges from a viscous liquid to a solid and which contains the following recurring structural unit:

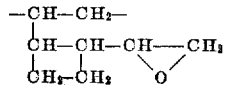

3. A fusible polymer of 1-(1,2-epoxyethyl)-2-vinylcyclobutane which ranges from a viscous liquid to a solid and which contains the following recurring structural unit:

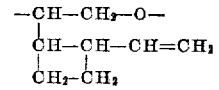

4. A copolymer of 1-(1,2-epoxyethyl)-2-vinylcyclobutane and an ethylenically unsaturated organic compound, each of the said copolymer components being polymerized through an ethylenic group, said copolymer ranging from a viscous liquid to a solid and containing the following recurring structural unit:

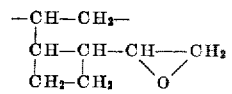

5. A curable polymerizable composition comprising a soluble, fusible polymer of 1-(1,2-epoxyethyl)-2-vinylcyclobutane which contains the following recurring structural unit:

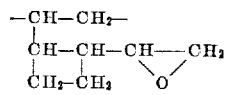

and a vicinal epoxy polymerization catalyst.

6. The cured, polymerized products obtained by subjecting the composition defined in claim 5 to a temperature of from about 10° C. to about 25° C.

7. A curable, polymerizable composition comprising a soluble, fusible polymer of 1-(1,2-epoxyethyl)-2-vinylcyclobutane which contains the following recurring structural unit:

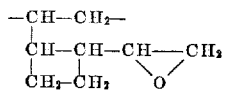

and a curing amount of an active organic hardener selected from the group consisting of polycarboxylic acids, polycarboxylic acid anhydrides, polyfunctional amines, polyols, polythiols, polyisocyanates, and polyacyl halides.

8. The fusible, thermosetting, intermediate reaction products obtained by subjecting from the composition defined in claim 7 to a temperature of from about 10° C. to about 25° C.

9. The cured, polymerized products obtained by subjecting the composition defined in claim 7 to a temperature of from about 10° C. to about 25° C.

10. A curable, polymerizable composition comprising a copolymer of 1-(1,2-epoxyethyl)-2-vinylcyclobutane and an ethylenically unsaturated organic compound, each of the said copolymer components being polymerized through an ethylenic group, said copolymer containing the following recurring structural unit:

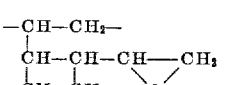

and a vicinal epoxy polymerization catalyst.

11. The cured polymerized products obtained by subjecting the composition defined in claim 10 to a temperature of from about 10° C. to about 25° C.

12. A curable, polymerizable composition comprising a copolymer of 1-(1,2-epoxyethyl)-2-vinylcyclobutane and an ethylenically unsaturated organic compound, each of the said copolymer components being polymerized through an ethylenic group, said copolymer ranging from a viscous liquid to a solid and containing the following recurring structural unit:

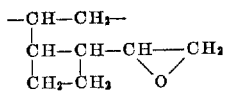

and a curing amount of an active organic hardener selected from the group consisting of polycarboxylic acids, polycarboxylic acid anhydrides, polyfunctional amines, polyols, polythiols, polyisocyanates, and polyacyl halides.

13. The fusible, thermosetting, intermediate reaction products obtained by subjecting the composition defined in claim 12 to a temperature of from about 10° C. to about 25° C.

14. The cured, polymerized products obtained by subjecting the composition defined in claim 12 to a temperature of from about 10° C. to about 25° C.

15. The unsoluble, cross-linked products obtained by reacting a polymer of 1-(1,2-epoxyethyl)-2-vinylcyclobutane which contains the following structural unit:

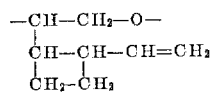

with a peroxide catalyst.

16. The insoluble, cross-linked products obtained by reacting a polymer of 1-(1,2-epoxyethyl)-2-vinylcyclobutane which contains the following structural unit:

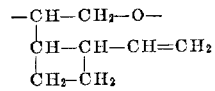

with an ethylenically unsaturated organic compound; in the presence of a peroxide catalyst; the reaction being effected through an ethylenic group of said polymer and said organic compound.

References Cited in the file of this patent

UNITED STATES PATENTS 2,807,599   Burk et al. _____ Sept. 24, 1957

UNITED STATES PATENT OFFICE
CERTIFICATE OF CORRECTION

Patent No. 3,096,315            July 2, 1963

Samuel W. Tinsley et al.

It is hereby certified that error appears in the above numbered patent requiring correction and that the said Letters Patent should read as corrected below.

Column 10, lines 37, 54, 57 and 72, and column 11, lines 18 and 21, for "25° C.", each occurrence, read -- 250° C. --.

Signed and sealed this 7th day of January 1964.

(SEAL)
Attest:

ERNEST W. SWIDER
Attesting Officer

EDWIN L. REYNOLDS
Acting Commissioner of Patents